US009562348B2

(12) United States Patent
Sochtig et al.

(10) Patent No.: US 9,562,348 B2
(45) Date of Patent: Feb. 7, 2017

(54) SANITARY THROUGHFLOW ELEMENT WITH A THROUGHFLOW REGULATOR UNIT AND METHOD FOR PRODUCING SAME

(75) Inventors: Michael Sochtig, Neuenburg (DE); Fabian Wildfang, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 413 days.

(21) Appl. No.: 14/003,602

(22) PCT Filed: Dec. 2, 2011

(86) PCT No.: PCT/EP2011/006042
§ 371 (c)(1),
(2), (4) Date: Sep. 6, 2013

(87) PCT Pub. No.: WO2012/123005
PCT Pub. Date: Sep. 20, 2012

(65) Prior Publication Data
US 2013/0341422 A1  Dec. 26, 2013

(30) Foreign Application Priority Data
Mar. 11, 2011  (DE) .......................... 20 2011 003 875

(51) Int. Cl.
  *E03C 1/08*  (2006.01)
  *E03C 1/086*  (2006.01)
  *G05D 7/01*  (2006.01)
(52) U.S. Cl.
  CPC .................. *E03C 1/086* (2013.01); *E03C 1/08* (2013.01); *G05D 7/012* (2013.01)

(58) Field of Classification Search
  CPC ............. G05D 7/012; E03C 1/08; E03C 1/086
  (Continued)

(56) References Cited

U.S. PATENT DOCUMENTS

| 2,950,063 A | 8/1960 | Ripley, Jr. |
| 4,258,801 A * | 3/1981 | Poston ...................... E21B 4/02 |
| | | 137/517 |

(Continued)

FOREIGN PATENT DOCUMENTS

| DE | 1228570 | 11/1966 |
| DE | 10228490 | 11/2003 |

(Continued)

*Primary Examiner* — Jason Boeckmann
(74) *Attorney, Agent, or Firm* — Volpe and Koenig, P.C.

(57) ABSTRACT

Sanitary throughflow element (1, 2, 30) which includes a throughflow rate regulator unit (5) having a carrier part (6) extending over the open cross section of a fluid line portion, the carrier part (6) having at least two inter-spaced insert openings (7) in which, respectively, a throughflow rate regulator (8) is arranged. Each throughflow rate regulator (8) has an elastic throttle body (9) which is round on the outer circumferential side in cross section and which delimits a control gap (10) between itself and a circumferential wall defining the insert opening (7). The throttle bodies (9) of the throughflow rate regulator (8) are compressed in the throughflow direction due to pressure of the through-flowing fluid such that this compression causes a circumferential widening of the throttle bodies (9) that constricts the control gap (10) determining a throughflow capacity of the throughflow rate regulator (8).

14 Claims, 10 Drawing Sheets

(58) Field of Classification Search
USPC .............................................. 239/428.5, 562
See application file for complete search history.

(56) References Cited

U.S. PATENT DOCUMENTS 4,657,186 A * 4/1987 Shapiro .................... B05B 1/14
239/462
5,799,700 A * 9/1998 Teh et al. ............... G05D 7/012
138/45

FOREIGN PATENT DOCUMENTS

FR          2275254       1/1976
WO         2008067948     6/2008

* cited by examiner

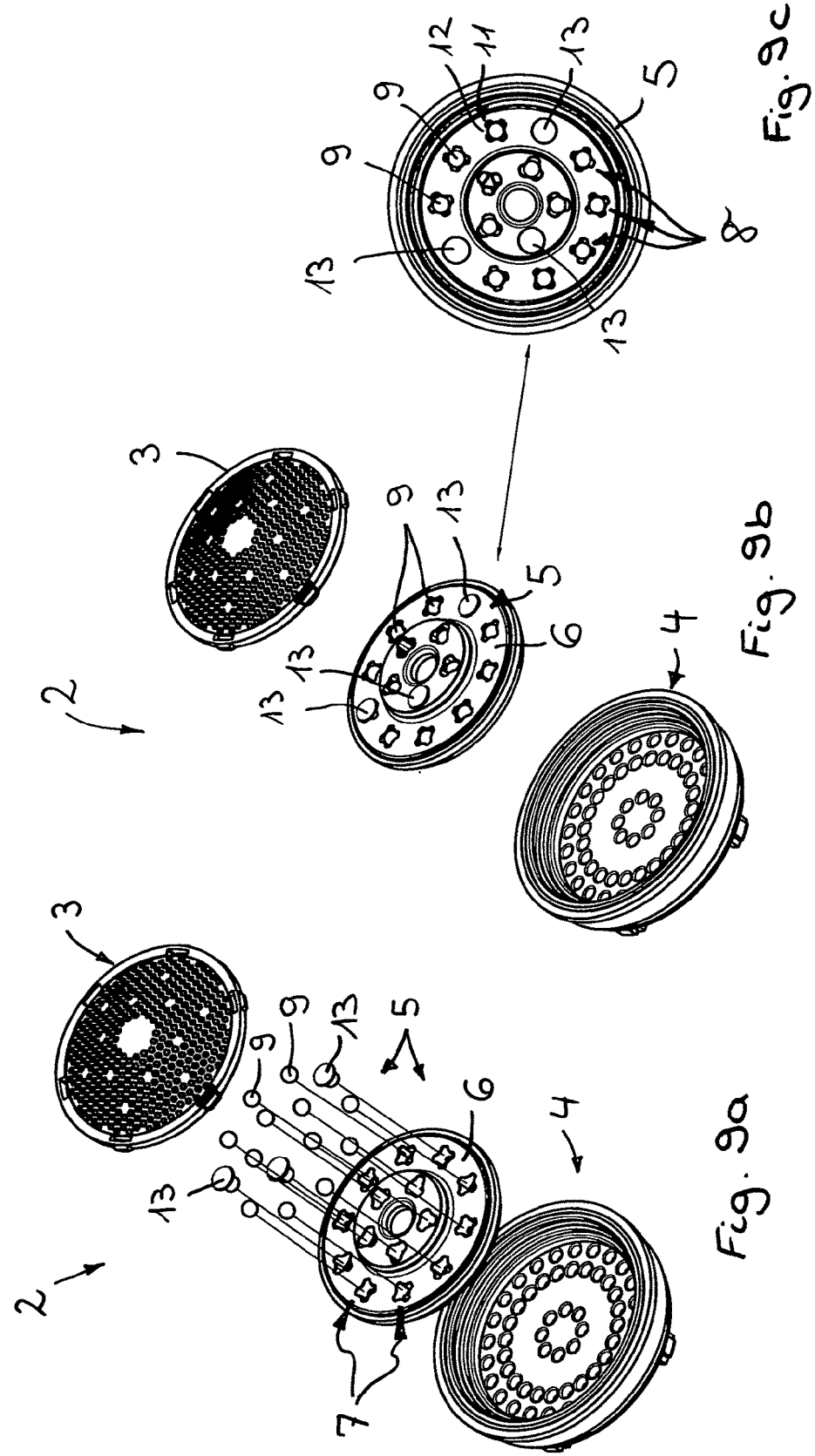

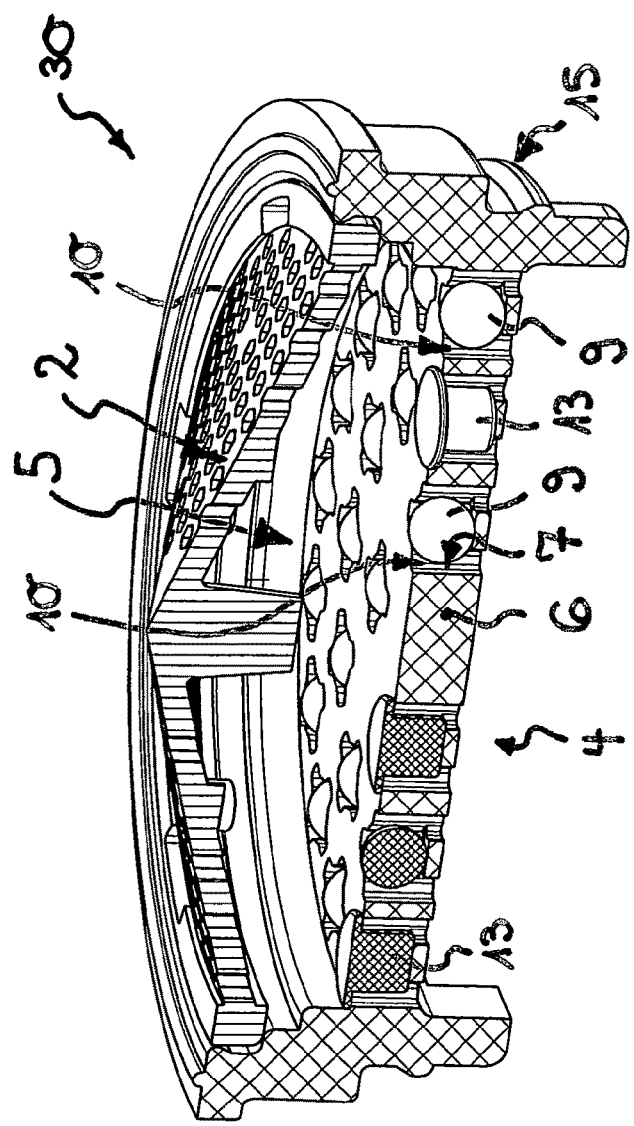

SANITARY THROUGHFLOW ELEMENT WITH A THROUGHFLOW REGULATOR UNIT AND METHOD FOR PRODUCING SAME

BACKGROUND

The invention relates to a sanitary flow element which has a flow rate regulator unit having a carrier part extending over the clear cross section of a fluid line section, which carrier part has at least two spaced-apart insertion openings in which in each case one flow rate regulator is arranged, wherein each flow rate regulator has an elastic-material restrictor which is round on the outer circumferential side in cross section, said restrictor delimiting a control gap between itself and a circumferential wall bounding the insertion opening.

The invention is also concerned with a method for producing a sanitary flow element of said type.

Flow regulators already exist which can be inserted, as a constituent part of a sanitary insert cartridge, into the water outlet of a water outlet fitting in order to limit the water volume flowing out of the water outlet per unit of time to a fixed maximum value in a manner independent of pressure. The flow rate regulators that are already known may for example be of disk-shaped form and bear an annular groove which is open on both face sides of the flow rate regulator and into which an annular restrictor comprised of elastic material is inserted. This restrictor delimits, between itself and an internally and/or externally profiled circumferential wall of the flow rate regulator, a control gap whose clear cross section changes as a result of the restrictor deforming into the regulating profile, provided on the circumferential wall, under the pressure of the fluid flowing through.

The maximum value of flow capacity that is sought with the aid of this already-known flow rate regulator can be fixed for example by means of the dimensioning of the restrictor or the configuration of the regulating profile. Since the material used for the restrictor is subject to certain fluctuations in properties from batch to batch, it is however often also the case that the maximum value sought can be fixed only with the acceptance of relatively large tolerances. Insofar as flow rate regulators are required for completely different maximum values of flow capacity, there is a need for differently configured regulator designs which differ in terms of their constituent parts. As a result, the storage and provision of such flow rate regulators is made additionally cumbersome.

DE 102 28 490 C1 has already disclosed a sanitary flow element of the type mentioned in the introduction, having a flow rate regulator unit which has a plate-shaped carrier part which extends over the clear cross section of a fluid line section. The carrier part has two spaced-apart insertion openings which are preferably arranged coaxially with respect to one another and in which in each case one flow rate regulator is arranged. Each of these flow rate regulators has an annular restrictor which is accordingly round on the outer circumferential side in cross section and is comprised of elastic material, with the restrictor delimiting a control gap between itself and a circumferential wall delimiting the insertion opening. The flow element already known from DE 102 28 490 C1 utilizes a relatively large line cross section through at least two preferably coaxial regulator units which are preferably functionally independent of one another. For this purpose, a first regulator unit is provided which fills the outer line cross section and which, in the region of its control pin, has a further, second regulator unit which is arranged in a passage opening provided in the control pin of the first regulator unit. While high throughputs in liters per unit time can be regulated by means of the first, relatively large regulator unit, fine-tuning of the amount of water flowing through is possible with the relatively small second regulator unit. By means of the already-known flow element comprised of at least two regulator units, the amount of water flowing through can be precisely regulated even in drinking and service water networks with large line cross sections.

In the case of the flow element already known from DE 102 28 490 C1, however, no compression of the restrictor in the flow direction takes place, and there is thus also no resulting circumferential widening of a restrictor of said type. The restrictor provided in the regulator units of the already-known flow element is duly deformed, but with increasing pressure is pressed predominantly into the notches of a regulating star such that, as a result, the passage openings for the water decrease in size. The greater the flow pressure becomes, the more intensely the annular restrictor provided in the flow regulator units deforms. With falling pressure, the annular restrictor gradually re-assumes its original shape, as a result of which the water passage openings become larger again.

U.S. Pat. No. 2,950,063 has already disclosed a sanitary flow element which is however formed exclusively as a jet aerator and which does not in any way have flow rate regulator unit. The jet aerator already known from U.S. Pat. No. 2,950,063 has a perforated plate as a jet splitter, which perforated plate has a number of flow holes and has the task of splitting the water flowing through into a corresponding number of individual jets. As a result of the flow constriction generated by the perforated plate, the flow speed of the water is increased in the region of the flow holes such that, on the outflow side, a negative pressure is generated which causes ambient air to be drawn into the jet regulator housing through the aeration openings provided in the jet regulator housing. To make it possible for the air drawn in to be mixed thoroughly with the water flowing through and for the individual jets to be slowed such that a sparkling, soft aerated water jet is generated, the outflow-side housing face plate has provided therein outlet openings into which in each case one spherical impingement body is inserted. The water flowing out of the already-known jet regulator impinges on the impingement bodies and, in the process, is braked, split up and mixed with ambient air before the water can finally flow out of the outlet openings of the already-known jet aerator. The jet aerator already known from U.S. Pat. No. 2,950,063 thus duly has spherical impingement bodies, but these are not intended to deform under the water pressure, and indeed are not intended for regulating the water flowing through to a defined flow rate independently of pressure fluctuations.

SUMMARY

It is therefore the object in particular to provide a sanitary flow element of the type mentioned in the introduction which has a flow rate regulator unit by means of which the sought maximum value of flow capacity can be fixed in a relatively simple and reliable manner. Furthermore, it is also the object to provide a method by which a sanitary flow element of said type can be produced inexpensively in a simple manner.

This object is achieved according to the invention, in the case of the sanitary flow element of the type mentioned in the introduction, in particular in that the restrictors of the flow rate regulator are formed in a conical, frustoconical or spherical manner and are subjected to compression in the flow direction under the pressure of the fluid flowing through, such that this compression causes a circumferential widening of the restrictors, said widening narrowing the control gap that determines the flow capacity of the flow rate regulator.

The sanitary flow element according to the invention has a flow rate regulator unit having a carrier part extending over the clear cross section of a water outlet or similar fluid line section. In this carrier part there are provided at least two insertion openings in which in each case one flow rate regulator is arranged. The insertion openings are spaced apart from one another such that the flow rate regulators are for example not arranged coaxially one inside the other but can be configured functionally separately from one another. This also means that the insertion openings may be situated adjacent to one another edge-to-edge. Each of the flow rate regulators provided on the carrier part of the flow rate regulator unit according to the invention has an elastic-material restrictor which is round on the outer circumferential side in cross section, said restrictor being formed in a conical, frustoconical or spherical manner and being configured as a closed molded body. Each of said restrictors delimits a control gap between itself and a circumferential wall bounding the insertion opening, wherein the restrictors of the flow rate regulator are subjected to compression in the flow direction under the pressure of the fluid flowing through, such that this compression causes a circumferential widening of the restrictors, said widening narrowing the control gap that determines the flow capacity of the flow rate regulator. Since multiple flow rate regulators with in each case one restrictor are provided on the carrier part of the flow rate regulator unit provided in the flow element according to the invention, and since the fluctuations in properties of the restrictors can be at least partially compensated, the flow element according to the invention is characterized in that the maximum value of flow capacity that is sought therewith can be fixed in a relatively simple and reliable manner. Here, it is also possible for more than two insertion openings to be provided on the carrier part of the flow element according to the invention, of which insertion openings the insertion openings remaining aside from at least two insertion openings which are each equipped with a flow rate regulator are closed off by a plug or are utilized in some other way.

One embodiment of the invention provides that the restrictors of at least two of the flow rate regulators provided in the carrier part differ from one another in terms of their regulating properties. In this embodiment, the restrictors of at least two flow regulators may for example be produced from different elastomer materials. In addition or instead, it is also possible for the circumferential walls, delimiting a control gap, of at least two of the flow rate regulators provided in the carrier part to have different regulating profiles from one another with differing regulating properties.

It is thus possible, with an individual population of the flow rate regulator unit, to define both the nominal flow capacity and also the tolerance field during assembly. For this purpose, it is possible, for example, for use to be made not only of the flow-rate-regulating restrictors but also of plugs which are inserted, by an extremely fast-acting assembly robot, into the relevant insertion openings in the carrier part of the flow rate regulator unit. At least a nominal flow capacity can thus be tuned. Depending on the flow capacity of individual restrictors, it is then also possible for the tolerance position of a tuned nominal flow capacity to be set. For example, if an individual flow rate regulator has a flow capacity of 0.1 l/min, then the tolerance field can be influenced correspondingly within a nominal flow class by the addition or omission of individual restrictors to or from the insertion openings of the carrier part. It is by all means conceivable for restrictors with different diameters to be used for the construction and production of a flow rate regulator unit, wherein for example relatively large restrictors serve for setting the nominal flow, whereas relatively small restrictors or relatively small control gaps are intended for influencing the tolerance field.

As has already been stated above, the maximum flow capacity of the flow rate regulator unit is fixable in a variation spectrum by selecting different flow rate regulators and in particular by selecting different restrictors and/or regulating profiles for at least two of the flow rate regulators provided on the carrier part.

One preferred refinement according to the invention provides that the maximum flow capacity of the flow rate regulator unit is fixable by the number of insertion openings, equipped with a flow rate regulator, in the carrier part. If the maximum flow capacity of the flow rate regulator unit is fixed solely by means of the number of insertion openings equipped with a flow rate regulator, the flow rate regulators used on the carrier part may be in each case of substantially identical construction.

A preferred embodiment of the invention provides that at least three insertion openings are provided in the carrier part, of which a flow rate regulator is arranged in at least two insertion openings, and of which at least one insertion opening is closed by means of a plug.

An embodiment is preferable in which the carrier part has the insertion openings, which insertion openings are bounded by a profiled circumferential wall; in this embodiment, only the restrictor comprised of elastic material need be inserted into the corresponding insertion opening in order, with the aid of said insertion opening and the associated restrictor, to produce one of the required flow rate regulators. It is however also possible for at least one of the flow rate regulators provided on the carrier part to be configured as a regulator insert comprising the restrictor and the at least one profiled circumferential wall, said regulator insert being inserted in an insertion opening. By inserting the required number of flow regulators into at least a subset of the insertion openings provided on the carrier part, the maximum overall flow capacity of the required flow rate regulator unit can be varied and fixed.

Here, it is particularly advantageous for the regulator insert to be inserted releasably or exchangeably in an insertion opening.

To hold the restrictor securely in the region of the profiled circumferential wall and to be able to always ensure the functioning of the flow rate regulator of a flow rate regulator unit, it is expedient for the regulating core to have, on its free regulating core end region, at least one securing projection which secures the restrictor on the regulating core in an axial direction.

A particularly space-saving embodiment of the invention provides that the carrier part is of plate-shaped form. For the same purpose, it may be advantageous for the regulating inserts, as well, to each be of disk-shaped form.

In order not only that, for example, the water jet flowing out of a sanitary outlet fitting is regulated to a fixed flow rate per unit time by means of the flow rate regulator unit in a manner independent of pressure but also that the emerging water is formed into a homogeneous, non-sputtering and, if appropriate, sparkling and soft water jet, it may be expedient for a jet regulator or at least one jet splitter that divides the stream of water into a multiplicity of individual jets to be connected downstream of the flow rate regulator unit in the direction of flow.

A preferred refinement of the invention provides that the carrier part is also in the form of a jet splitter of a jet regulator, with the jet splitter dividing the inflowing water into a plurality of individual jets. Such a refining embodiment in which the carrier part is simultaneously also formed as the jet splitter of a jet regulator permits a particularly compact and flat configuration of the flow element according to the invention.

Here, the jet regulator integrated into the flow element according to the invention may be in the form of a non-aerated or an aerated jet regulator.

A preferred embodiment of the invention provides that at least one stream straightening or stream forming grid or mesh structure is connected downstream of the jet splitter of the jet regulator in the direction of flow, which grid or mesh structure is preferably formed by webs which intersect at crossing nodes.

It is however also possible for the flow rate regulator unit and the jet regulator or jet splitter to be spaced apart from one another.

Since the flow element may be of relatively flat configuration, it is also possible for the flow rate regulator unit and if appropriate the jet regulator or jet splitter to be provided in a preferably common insert housing.

In the case of the method of the type mentioned in the introduction, the object is achieved according to the invention. For the production of the sanitary flow element described above, the method according to the invention provides that the number of insertion openings, equipped with a flow rate regulator or a restrictor, that is required for a fixed maximum flow rate per time unit is determined by measuring the flow capacity and, depending thereon, by inserting flow rate regulators or restrictors into further insertion openings or by removing further flow rate regulators or restrictors from insertion openings and by closing the insertion openings, not required for a flow rate regulator, in the carrier part.

The production and assembly of such flow elements may take place similarly to the population of a printed circuit board with components, such that a simultaneous population of the multiplicity of components is not imperatively necessary but also should not be ruled out. For example, it is possible for flow rate regulators or restrictors to be supplied to the carrier part sequentially. By contrast, another method implementation provides that the flow rate regulators or restrictors required in the insertion openings of the carrier part, and if appropriate also the plugs provided for closing the insertion openings which are not required, are mounted on the carrier part substantially simultaneously. It is thus possible for the components to be used for the flow rate regulator unit, possibly combined with a jet regulator, to be provided at the respective positions in a corresponding mounting preparation station in order to then be able to be placed on the carrier part of the flow rate regulator unit used in the flow element according to the invention, or mounted into said carrier part, simultaneously in one working step. The method according to the invention is characterized in that it is possible in an extremely flexible manner to set individual flow rates in the flow rate regulator unit of the flow element, and/or to react in an extremely flexible manner to the flow fluctuations that always exist owing to fluctuations in the material properties or dimensions.

Here, one particularly advantageous refinement of the method according to the invention provides that the production is integrated into a closed control loop, such that the number of flow rate regulators or restrictors required for producing a previously assembled flow rate regulator unit is initially also used for the production of the subsequently assembled flow rate regulator unit, before subsequent method steps are carried out to measure the maximum flow rate per unit of time in the case of the subsequently assembled flow rate regulator unit and, depending thereon, ultimately fix said maximum flow rate per unit of time by inserting flow rate regulators or restrictors into further insertion openings or by removing further flow rate regulators or restrictors from insertion openings and by closing the insertion openings, not required for a flow rate regulator, in the carrier part.

BRIEF DESCRIPTION OF THE DRAWINGS

Refinements of the invention will emerge from the description in conjunction with the claims and the drawing. The invention will be described in even greater detail below on the basis of preferred exemplary embodiments.

In the drawings:

FIGS. 9a to 9c show individual method steps for the production and assembly of the flow element shown in FIG. 6, and FIG. 10 shows a sanitary flow element, similar to that in FIGS. 1 to 4, 6 and 9, in which the carrier part of the flow rate regulator unit is simultaneously also formed as a jet splitter of a jet regulator.

DETAILED DESCRIPTION OF THE PREFERRED EMBODIMENTS

Figure 1:
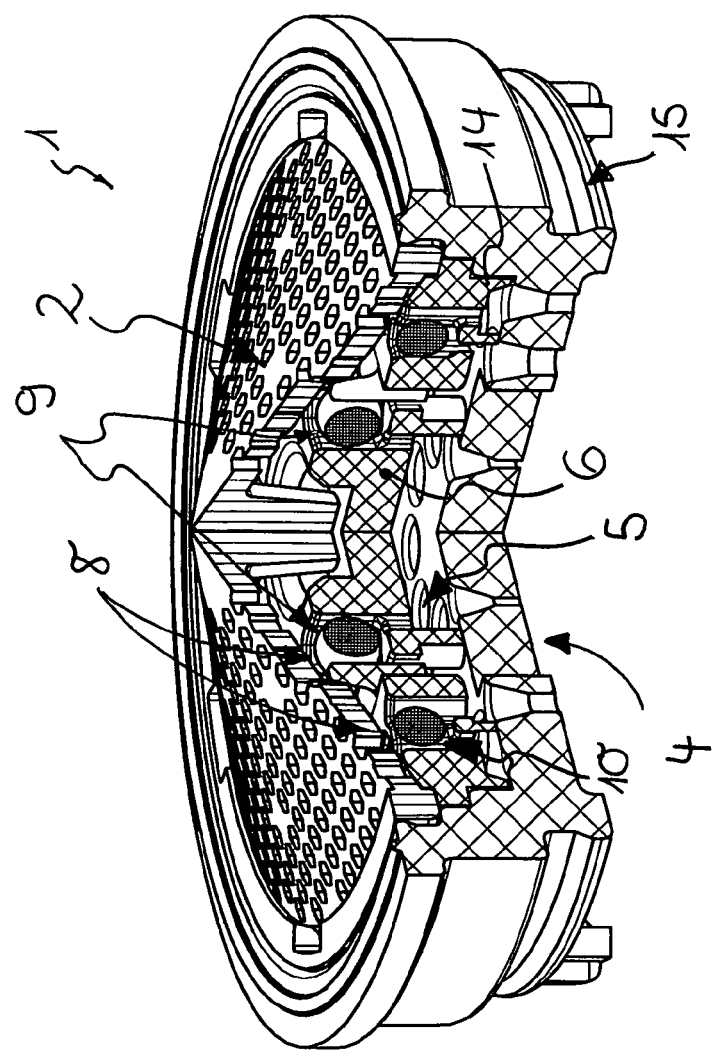
FIG. 1 shows a perspective, partially sectional illustration of a sanitary flow element composed of an inflow-side upstream screen, an outflow-side jet splitter and interposed flow rate regulator unit, wherein the flow rate regulator unit has a disk-shaped carrier part with a multiplicity of insertion openings, into which insertion openings a restrictor, which is of round cross section and is in this case circular and which is composed of elastic material, is inserted in order to form in each case one flow rate regulator.
Figure 2:
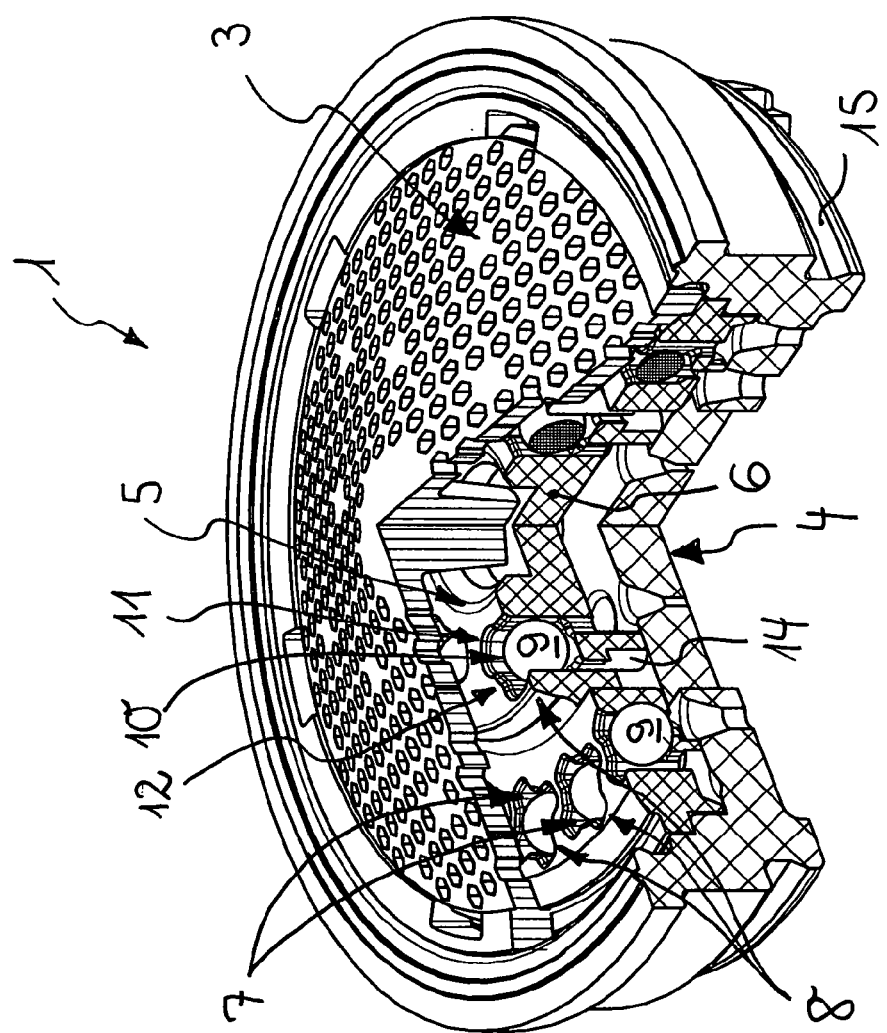
FIG. 2 shows the flow element from FIG. 1 in a partially sectional perspective plan view of the inflow side.
Figure 3:
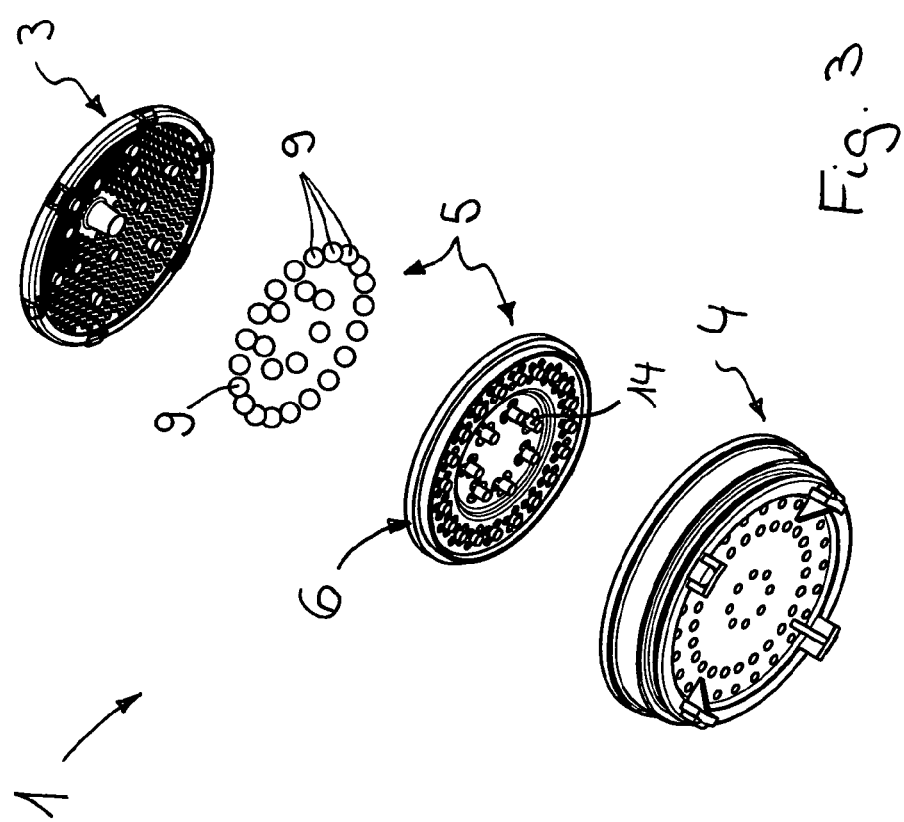
FIG. 3 shows the flow element from FIGS. 1 and 2 in an exploded perspective illustration of its individual parts, with the view directed toward the outflow side of said assembly.
Figure 4:
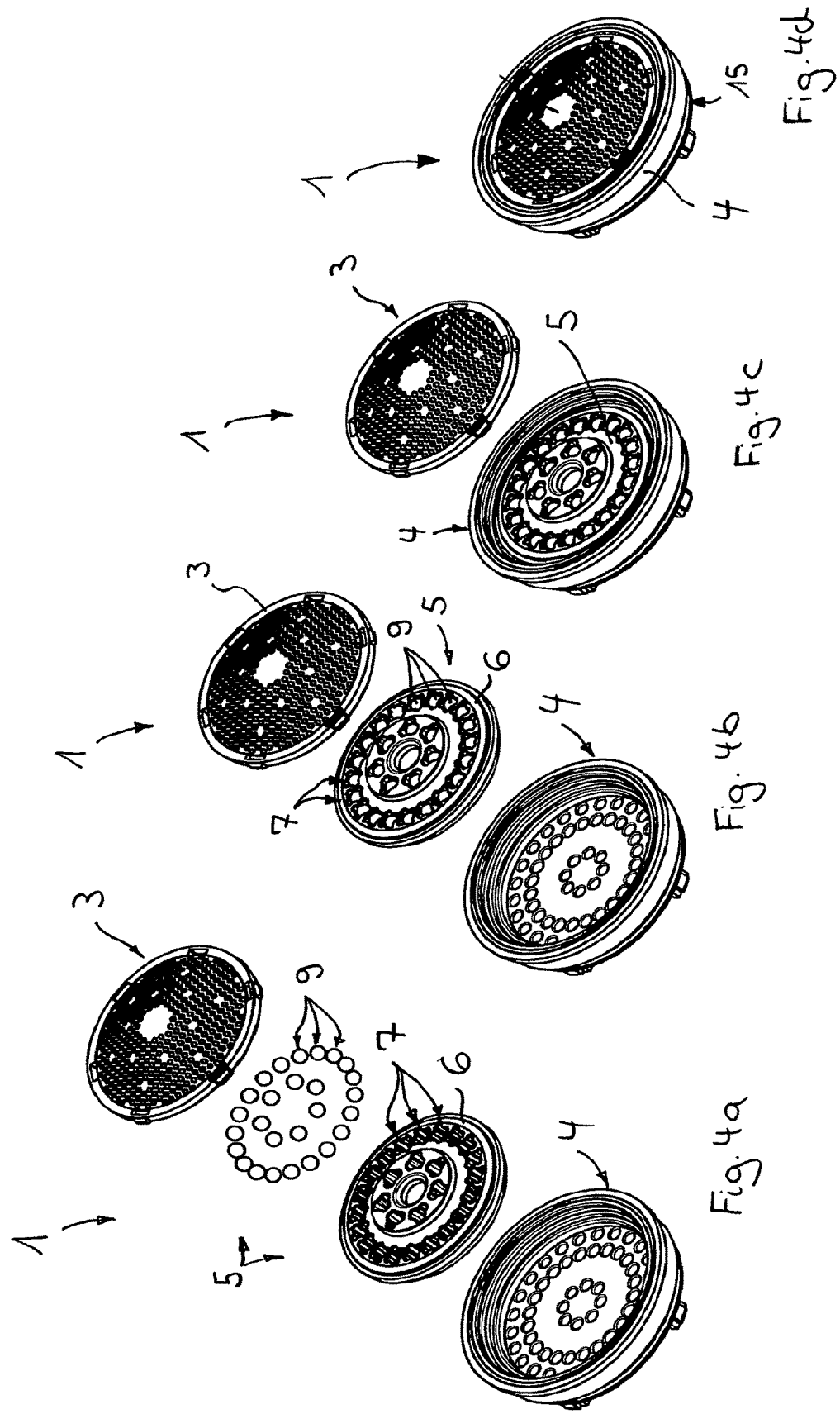
FIGS. 4a to 4d show individual method steps for the production and assembly of the flow element shown in FIGS. 1 to 3.
Figure 5:
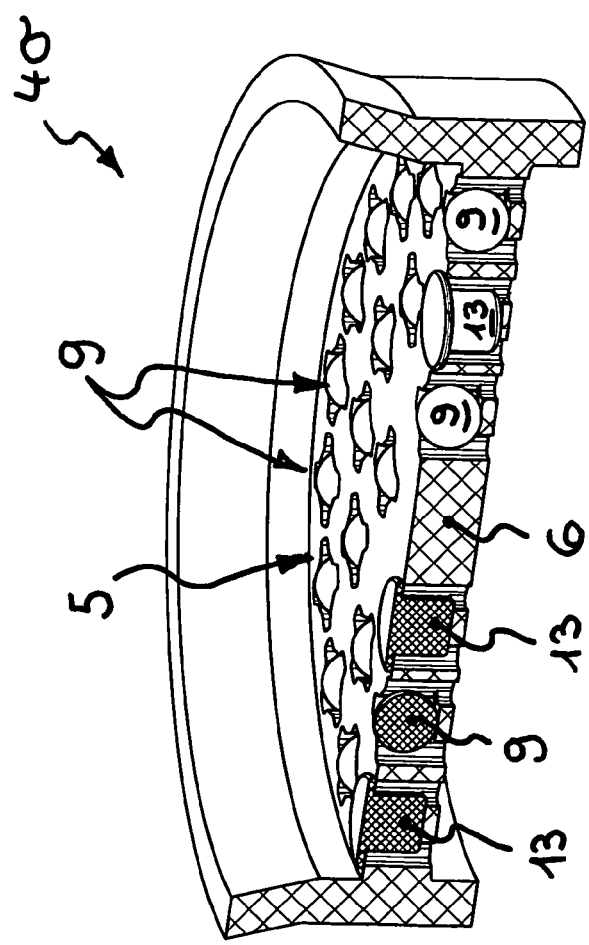
FIG. 5 shows a perspective, partially sectional illustration of a flow element, similar to that in FIGS. 1 to 4, in a simplified embodiment, wherein individual insertion openings of the flow rate regulator unit of said flow element are closed in a liquid-tight manner by means of in each case one plug.
Figure 6:
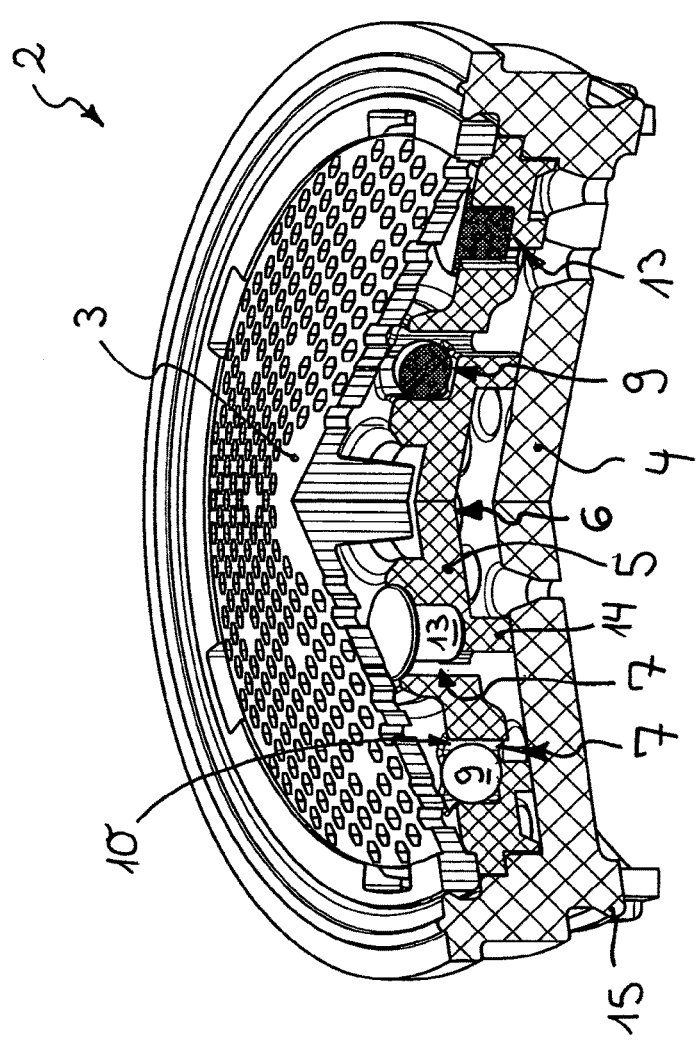
FIG. 6 shows, likewise in a perspective, partially sectional illustration, a flow element similar to that in FIG. 5.

FIGS. 1 to 10 illustrate a sanitary flow element in five embodiments 1, 2, 30, 40 and 50. The assemblies 1, 2, 30, 40 and 50 have a flow rate regulator unit 5, wherein an inflow-side upstream screen is connected upstream of the flow rate regulator unit 5 of the assemblies 1, 2, 30 and 50. The inflow-side upstream screen 3, which in this case widens conically in the direction of flow, of the assemblies 1, 2, 30, 50 has the task of filtering and retaining any dirt particles that may be entrained in the water, such that said dirt particles do not become lodged in the functional units downstream and lead to function-impairing faults therein. Whereas the flow rate regulator unit of the assemblies 1, 2 is followed in the direction of flow by a jet splitter 4, the assembly 40 as per FIG. 5 is provided merely as a flow rate regulator unit. By contrast, in the case of the assemblies 30, 50 illustrated in FIGS. 7, 8 and 10, the flow element 5 itself is configured as a jet splitter of a jet regulator.

From a comparison of FIGS. 1 to 4, 6 and 9, it is clear that the outflow-side jet splitter 4—as is the case here—may be in the form of a perforated plate or else in the form of a diffuser. The jet splitter 4 has the task of dividing the water stream flowing through into a multiplicity of individual jets. By means of the flow rate regulator unit 5 provided in the assemblies 1, 2, 30, 40, 50, the water flowing through is regulated to a maximum flow capacity per unit time in a manner independent of pressure.

Each flow rate regulator unit 5 of the assemblies 1, 2, 30, 40, 50 has a carrier part 6 which extends over the clear cross section of the liquid-conducting fluid line section. The carrier part 6 has at least two spaced-apart insertion openings 7 in which in each case one flow rate regulator 8 is arranged. Each flow rate regulator 8 has an elastic-material restrictor 9 which is round on the outer circumferential side in cross section, said restrictor deforming elastically under the pressure of the medium flowing through. The restrictors 9 which are round on the outer circumferential side in cross section are formed as a molded body which is closed on all sides and which may for example be of conical or frusto-conical form. Since the restrictors 9 are formed as molded bodies which are closed on all sides, they have for example no annular opening. The restrictors 9 which are round on the outer circumferential side in cross section are formed from elastic material and delimit a control gap 10 between themselves and a circumferential wall bounding the insertion opening. The individual jets generated in the region of the control gaps 10 are accelerated such that a pressure difference is generated. The restrictors 9 of the flow rate regulators 8 are subjected to compression in the flow direction under the pressure of the fluid flowing through, such that this compression simultaneously causes a circumferential widening of the restrictors 9, with this widening narrowing the control gap 10 that determines the flow capacity of the flow rate regulator 8. Although the circumferential wall bounding an insertion opening 7 may possibly also be of smooth-walled form, the embodiment illustrated here is preferable, in which a regulating profile, formed in this case by inwardly and outwardly formed sections 11, 12 which are oriented in the flow direction and which preferably merge into one another in an undulating manner, is provided on the circumferential wall of the insertion opening 7 assigned to a restrictor 9. The restrictor 9, which deflects elastically under the pressure of the fluid flowing through, is, with increasing pressure, deformed such that it progressively deforms into the regulating profile, narrows the control gap 10 and limits and regulates the maximum flow capacity per unit time to a fixed value in a manner independent of pressure.

It is possible for the flow rate regulators 8 to differ from one another in terms of their flow capacity and/or in terms of their regulating properties. The embodiments illustrated here are however preferable, in which the restrictors 9 of the flow rate regulators 8 provided in the flow rate regulator unit 5 are at least substantially structurally identical.

The maximum flow rate of the flow rate regulator unit 5 is in this case fixable by means of the number of insertion openings 7 equipped with a flow rate regulator 8 and, specifically, with a restrictor 9. Whereas it is the case in the flow elements 1, 30 illustrated in FIGS. 1 to 4 and FIG. 10 that each insertion opening 7 of the carrier part 6 has inserted therein a restrictor 9 provided for completing and providing the function of in each case one flow rate regulator 8, the assemblies 2, 30, 40 and 50 illustrated in FIGS. 5 to 10 have, in their throughflow regulator unit 5, at least three insertion openings 7, in at least two insertion openings 7 of which there is provided a flow rate regulator 8, and at least one insertion opening 7 of which is closed in a liquid-tight manner by means of a plug 13.

When the method steps illustrated in FIGS. 1 to 10 and required for the production of the assemblies 1, 2, 30, 40, 50 and the flow rate regulator units 5 thereof are viewed together, it is clear that the restrictors 9 can be inserted into the insertion openings 7 of the carrier part 6 with the aid of a preferably extremely fast-acting assembly robot. To be able to tune the nominal flow capacity to requirements, it is provided in the case of the flow rate regulator unit 5 shown in FIGS. 5 to 10 that the insertion openings 7 required for attaining the nominal flow capacity are populated with a restrictor 9, whereas the insertion openings 7 additionally provided on the carrier part 6 should each be closed in a liquid-tight manner by means of a plug 13. Depending on the flow capacity of the individual flow regulators 8, the tolerance position of a tuned nominal flow capacity may also be set; for example, if a restrictor 9 which is also of small configuration and which can be inserted into a correspondingly relatively small insertion opening 7 is configured for a throughflow of 0.1 l/min, then it is also possible, through the addition and omission of individual restrictors 9 of this type, for the tolerance field to be tuned within a nominal flow class.

It is possible for the carrier part 6 of a flow rate regulator unit 5 to be populated sequentially with the in this case spherical restrictors 9 and, if appropriate, with the plug 13. In FIGS. 4 and 9, however, it is indicated that said constituent parts should in this case be inserted simultaneously into the insertion openings 9 of the carrier part 6.

It can be seen in FIGS. 1 to 4 and 9 that a jet splitter 4 is connected downstream of the flow rate regulator units 5 of the flow elements 1, 2. In the case of the flow elements 1, 2 according to FIGS. 1 to 4 and 9, said jet splitter 4 is of pot-shaped or pan-shaped form, wherein the pot or pan base is formed as a perforated plate which has a multiplicity of flow holes which have the task of splitting the water flowing through into a multiplicity of individual jets. The disk-shaped flow rate regulator unit 5 can be inserted into the interior of the jet splitter 4 before the upstream screen 3 is preferably releasably latched to the inflow-side circumferential edge of the jet splitter 4. Provided on the outflow side of the carrier part 6 are spacers 14 which, in this case, project in the manner of pins and which ensure an adequate spacing between the flow rate regulator unit 5 and the perforated plate of the jet splitter 4. The restrictors 9 are inserted with or without radial and/or axial play, but captively in any case, into the insertion openings 7 of the carrier part 6. It can be seen in FIGS. 7, 8 and 10 that the flow element 5 itself may also be configured as a jet splitter of a jet regulator. Here, not only does the flow element 5 of a jet regulator of said type, which is of particularly compact configuration, regulate the flow capacity of said jet regulator, that is to say the flow volume per unit time, to a fixed maximum value in a manner dependent on pressure, the individual jets generated in each case in the insertion openings 7, equipped with a flow rate regulator, of the carrier part 6 are accelerated such that a negative pressure is generated on the outflow side of the flow elements 5, which negative pressure can be utilized for drawing ambient air into the interior of the jet regulator housing. The ambient air is drawn into the jet regulator housing via the aeration openings 51, visible in FIGS. 7 and 8 and provided on the housing circumference of the jet regulator housing, and is mixed with the individual jets passing from the jet splitter, such that a homogeneous, non-sputtering and sparkling, soft water jet is formed.

Figure 7:
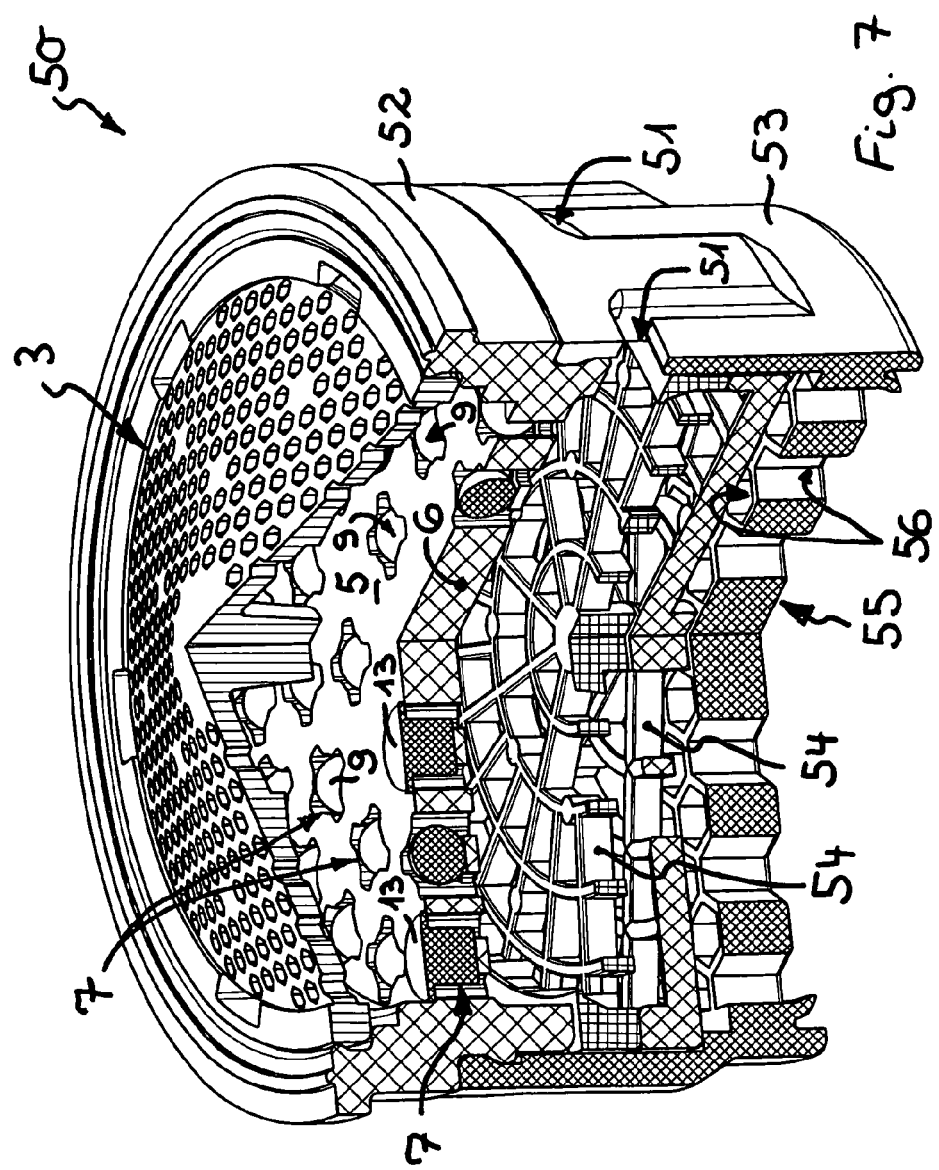
FIG. 7 shows the flow element from FIG. 6, whose carrier part, formed as a jet splitter, is in this case integrated into the jet regulator housing of a jet regulator, wherein a plurality of jet-regulating or jet-shaping grid, mesh or similar perforated structures are connected downstream of the carrier part, formed as a jet splitter, in the direction of flow, of which at least one inflow-side grid, mesh or similar perforated structure can be inserted into the housing interior of the jet regulator housing from the inflow side of the latter.
Figure 8:
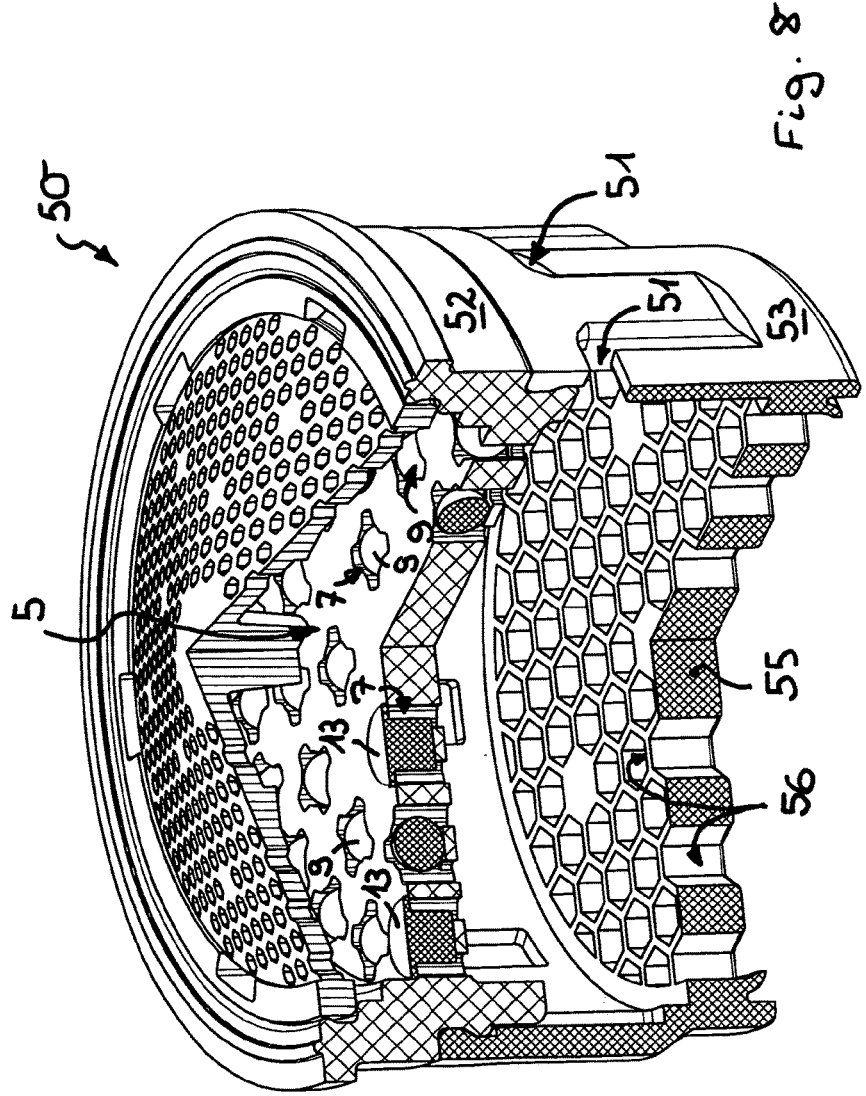
FIG. 8 shows a jet regulator of similar configuration to that in FIG. 7, wherein only one perforated structure is connected downstream of the carrier part, formed as a jet splitter, of the flow element in the direction of flow, which perforated structure forms the outlet face side, integrally formed on the jet regulator housing, of the jet regulator, wherein said perforated structure in this case has through-flow holes of honeycomb-like form.

Whereas it is the case in the flow elements 1, 2 shown in FIGS. 1 to 4, 6 and 9 that the flow rate regulator unit 5 and the jet splitter 4 of the jet regulator are spaced apart from one another, it is the case in the flow element 30, 50 shown in FIGS. 7, 8 and 10 that the carrier part 6 is also formed as a jet splitter 4 of a jet regulator, which jet splitter 4 has the task here, too, of splitting the water flowing in into a number of individual jets corresponding to the number of insertion openings 7 equipped with a flow rate regulator 8.

As shown by the exemplary embodiment shown in FIG. 7, at least one stream straightening or stream-shaping grid or mesh structure, formed from webs which intersect at crossing nodes, may be connected downstream of the jet splitters 4 of the jet regulators which have the flow elements 1, 2, 30 and 50. Of said grid or mesh structures, at least one grid or mesh structure may be configured as a disk-shaped insert part 52, which insert part 52 can be inserted into a sleeve-shaped housing section. Therefore, the jet regulator illustrated in FIGS. 7 and 8 has a jet regulator housing whose inflow-side housing part 53 which has the flow element 50 is releasably latched to the outflow-side housing part 54 and in whose outflow-side housing part 54 the disk-shaped insert parts 52 can be inserted.

By contrast, the exemplary embodiment shown in FIG. 8 has only one outflow-side perforated structure 55 with flow holes 56 of honeycomb-like configuration, which hole structure 55 forms the outflow face side, formed integrally on the jet regulator housing, of the jet regulator. Such a perforated structure 55 with flow holes 55 of honeycomb-like configuration is also provided in the exemplary embodiment shown in FIG. 7.

The flow elements 1, 2, 30 and 50 shown in FIGS. 1 to 4 and 6 to 10 may form the inflow side of an insert cartridge which can be mounted in the water outlet of a sanitary outlet fitting. In the exemplary embodiment shown on the basis of FIGS. 7 and 8, a jet regulating device and/or a flow straightener may be provided for the jet regulator housing, formed as a cartridge housing, of the insert cartridge, which jet regulating device and/or flow straightener complete the jet splitter 4 so as to form a jet regulator which is also aerated if appropriate. To be able to also releasably fasten the assemblies to a cartridge housing of said type, at least one latching means 15 is provided on the carrier part 6 at the outflow side, which latching means interacts with a counterpart latching means on the preferably sleeve-shaped cartridge housing or on the housing section.

The invention claimed is:

1. A sanitary flow element (1, 2, 30) comprising a flow rate regulator unit (5) having a carrier part (6) extending over a clear cross section of a fluid line section, said carrier part (6) has at least two spaced-apart insertion openings (7) in which in each case one flow rate regulator (8) is arranged, each of the flow rate regulators (8) has an elastic-material restrictor (9) which is round on an outer circumferential side in cross section, said restrictor (9) delimiting a control gap (10) between itself and a circumferential wall bounding the insertion opening (7), the restrictors (9) of the flow rate regulator (8) are formed in a conical, frustoconical or spherical manner and are subjected to compression in a flow direction under pressure of fluid flowing through, such that the compression causes a circumferential widening of the restrictors (9), said widening narrowing the control gap (10) that determines a flow capacity of the flow rate regulator (8) wherein at least one of the flow rate regulators (8) provided on the carrier part (6) is configured as a regulator insert comprising the restrictor (9) and at least one of the circumferential walls comprising inwardly and outwardly curved sections, said regulator insert being inserted in one of the insertion openings (7).

2. The flow element as claimed in claim 1, wherein at least two of the flow rate regulators (8) provided in the carrier part (6) have different flow regulating properties from one another.

3. The flow element as claimed in claim 1, wherein the restrictors (9) of at least two of the flow rate regulators (8) provided in the carrier part (6) have different flow regulating properties from one another.

4. The flow element as claimed in claim 1, wherein the circumferential walls, delimiting the control gap (10), of at least two of the flow rate regulators (8) provided in the carrier part (6) have different regulating profiles from one another with differing regulating properties.

5. The flow element as claimed in claim 1, wherein a maximum flow capacity of the flow rate regulator unit (5) is fixable in a variation spectrum by selecting at least one of different ones of the flow rate regulators (8), different ones of the restrictors (9), or different ones of the regulating profiles, for at least two of the flow rate regulators (8) provided on the carrier part (6).

6. The flow element as claimed in claim 1, wherein a maximum flow capacity of the flow rate regulator unit (5) is fixable by a number of insertion openings (7), equipped with a flow rate regulator (8), in the carrier part (6).

7. A sanitary flow element (1, 2, 30) comprising a flow rate regulator unit (5) having a carrier part (6) extending over a clear cross section of a fluid line section, said carrier part (6) has at least two spaced-apart insertion openings (7) in which in each case one flow rate regulator (8) is arranged, each of the flow rate regulators (8) has an elastic-material restrictor (9) which is round on an outer circumferential side in cross section, said restrictor (9) delimiting a control gap (10) between itself and a circumferential wall bounding the insertion opening (7), the restrictors (9) of the flow rate regulator (8) are formed in a conical, frustoconical or spherical manner and are subjected to compression in a flow direction under pressure of fluid flowing through, such that the compression causes a circumferential widening of the restrictors (9), said widening narrowing the control gap (10) that determines a flow capacity of the flow rate regulator (8), wherein at least three of the insertion openings (7) are provided in the carrier part (6), of which a flow rate regulator (8) is arranged in at least two insertion openings (7), and of which at least one insertion opening (7) is closed by a plug (13).

8. The flow element as claimed in claim 1, wherein the restrictor (9) or the regulator insert is inserted releasably or exchangeably into an insertion opening (7).

9. The flow element as claimed in claim 1, wherein a jet regulator or at least one jet splitter (4) that divides a stream of water into a multiplicity of individual jets is connected downstream of the flow rate regulator unit (5) in a direction of flow.

10. The flow element as claimed in claim 1, wherein the carrier part (6) is also in the form of a jet splitter (4) of a jet regulator, said jet splitter (4) dividing inflowing water into a plurality of individual jets.

11. The flow element as claimed in claim 10, wherein at least one stream straightening or stream-shaping grid or mesh structure is connected downstream of the jet splitter (4) of the jet regulator in the direction of flow.

12. The flow element as claimed in claim 10, wherein the flow rate regulator unit (5) and the jet regulator or jet splitter (4) are spaced apart from one another.

13. The flow element as claimed in claim 9, wherein the flow rate regulator unit (5) and the jet regulator or jet splitter (4) are provided in a common insert housing or cartridge housing.

14. A method for producing a flow element as claimed in claim 1, wherein the number of insertion openings (7), equipped with a flow rate regulator (8) or a restrictor (9), that is required for a fixed maximum flow rate per time unit is determined by measuring a flow capacity and, depending thereon, by inserting the flow rate regulators (8) or the restrictors (9) into further insertion openings (7) or by removing further ones of the flow rate regulators (8) or the restrictors (9) from insertion openings (7) and by closing the insertion openings (7), not required for any of the flow rate regulators (8), in the carrier part (6).

* * * * *